United States Patent [19]

Katsman et al.

[11] Patent Number: 4,590,709
[45] Date of Patent: May 27, 1986

[54] DOOR SUPPORT FOR A BATTERY STORAGE CABINET OR THE LIKE

[75] Inventors: Ilya Katsman, Bloomfield; John A. Ritchie, Lake Hopatcong; Mark Burmenko, Fairlawn; Vladimir Zaltsman, Bloomfield, all of N.J.

[73] Assignee: Cooper Industries, Inc., Houston, Tex.

[21] Appl. No.: 653,330

[22] Filed: Sep. 24, 1984

[51] Int. Cl.⁴ .............................................. E05F 7/06
[52] U.S. Cl. ...................................... 49/396; 312/276
[58] Field of Search ......................... 49/396; 312/276; 248/439

[56] References Cited

U.S. PATENT DOCUMENTS

| | | | |
|---|---|---|---|
| 1,520,589 | 12/1924 | Matkovic | 248/439 |
| 2,213,461 | 9/1940 | Ellis, Jr. | 49/396 X |
| 2,644,258 | 7/1953 | Gillette | 49/396 X |
| 3,281,992 | 11/1966 | Morrison | 49/396 |
| 3,741,620 | 6/1973 | Kull et al. | 312/276 |
| 4,079,679 | 3/1978 | Bechtold | 248/439 X |
| 4,441,770 | 4/1984 | Brezosky | 312/276 |

*Primary Examiner*—Philip C. Kannan
*Attorney, Agent, or Firm*—Nelson A. Blish; Eddie E. Scott; Alan R. Thiele

[57] ABSTRACT

A support for a vertically hinged door including a bracket affixed to the lowermost free corner of the door and a pivotable support leg attached to the bracket for automatic movement between an extended support position and a horizontal stored position is disclosed. The support is provided with a stop and automatic latch for retaining the support leg in the support position.

12 Claims, 10 Drawing Figures

FIG. 3
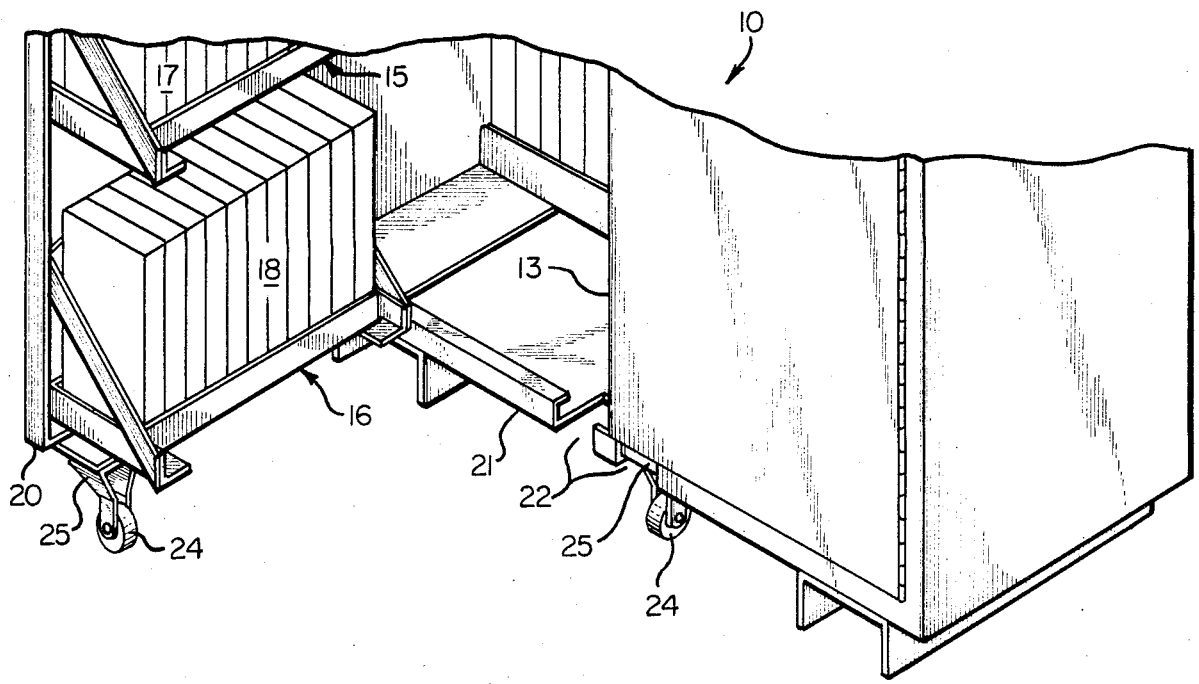
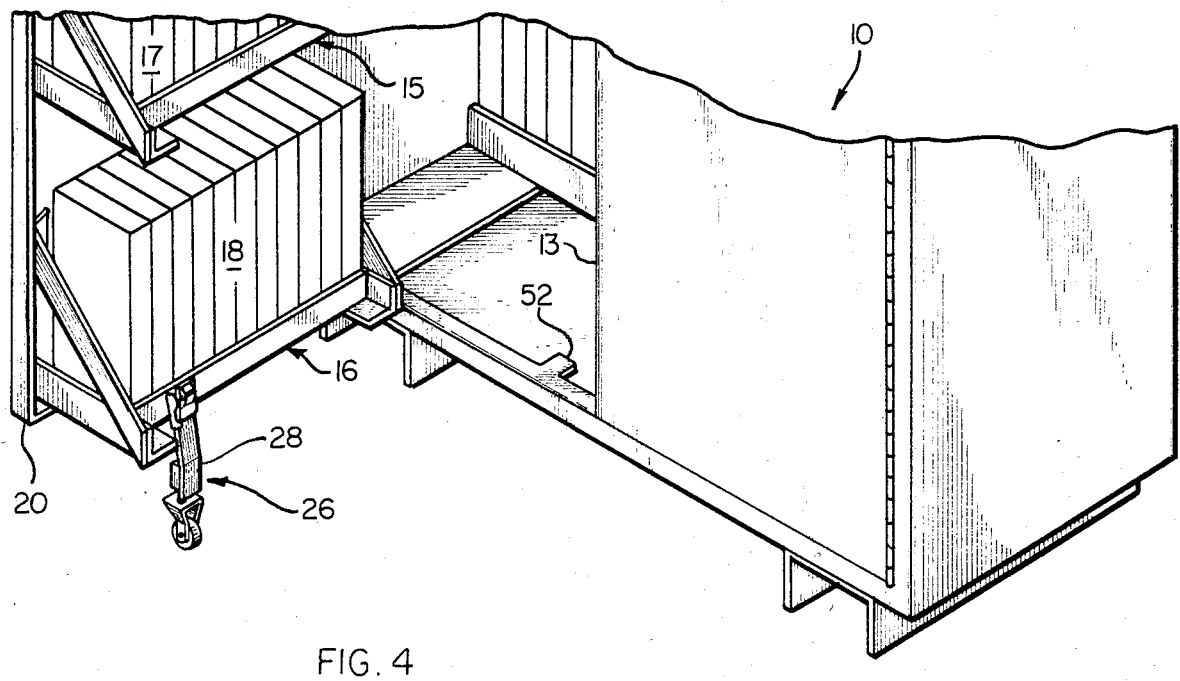
FIG. 4

/ 4,590,709 /

DOOR SUPPORT FOR A BATTERY STORAGE CABINET OR THE LIKE

BACKGROUND OF THE INVENTION

This invention relates to support devices. More particularly, the invention relates a device for supporting doors that carry large cantilever type loads. In still greater particularity, the invention relates to a support device particularly adapted for use on doors used in storage cabinets.

The battery console disclosed in the above application mounts a plurality of battery cells on the inner surface of a vertically hinged cabinet door. In doing so the cantilever loads imposed on the hinges of the door are greatly increased. This is especially true as the width of the door is increased because the load is placed farther from the hinge. Additionally, when large numbers of battery cells are mounted and/or very wide doors and high cabinets are employed, the cabinet is subject to tipping forward when the door is opened. Therefore, it can be appreciated that it would be highly desirable to provide for means of supporting the door, particularly at a point as far removed from the hinges as possible so as to prevent tipping of the cabinet and to reduce wear on the door hinges. The frame of the door in the above-mentioned battery console is typically a full 360° frame and therefore, for both aesthetic and operational purposes, it is highly desirable to provide for a support that retracts out of sight. For ease in operation it is also desirable that the support extend and retract automatically as the cabinet door is opened and closed.

SUMMARY OF THE INVENTION

According to one aspect of the invention, a support leg is fastened to the lowermost free corner of the door in the form of a rigid, fixed, elongated member.

According to another embodiment of the invention, a castor wheel is rotatably journaled to the lowermost free corner of the door.

According to a third aspect of the invention, the support leg is provided with pivotal motion between a retracted position whereat the support leg is horizontally positioned beneath the bottom surface of the door and an extended vertical support position depending from the bottom of the door.

In accordance with a still further important aspect of the invention, the support leg is provided with a latch and automatic release mechanism for retaining the support leg in the support position and provides for automatic retraction of the leg to the stored position when support is no longer required.

Another important feature of the invention includes a castor wheel rotatably journaled on the free end of the pivotable support leg providing for reduced effort in opening and closing of the door, as well as providing for the needed support due to the weight carried by the door and automatic extension and retraction of the support leg.

BRIEF DESCRIPTION OF THE DRAWINGS

The invention will be better understood after a reading of the following detailed description of the preferred embodiment taken in connection with the accompanying drawings wherein:

FIG. 3 is perspective view of a cut-away portion of the cabinet of FIG. 1, showing another alternative embodiment of the invention employing a fixed castor wheel;

FIG. 4 is perspective view of a cut-away portion of the cabinet of FIG. 1, showing an alternative embodiment of the pivotable support of FIG. 1, employing a castor wheel;

DETAILED DESCRIPTION OF THE PREFERRED EMBODIMENT

Figure 1:
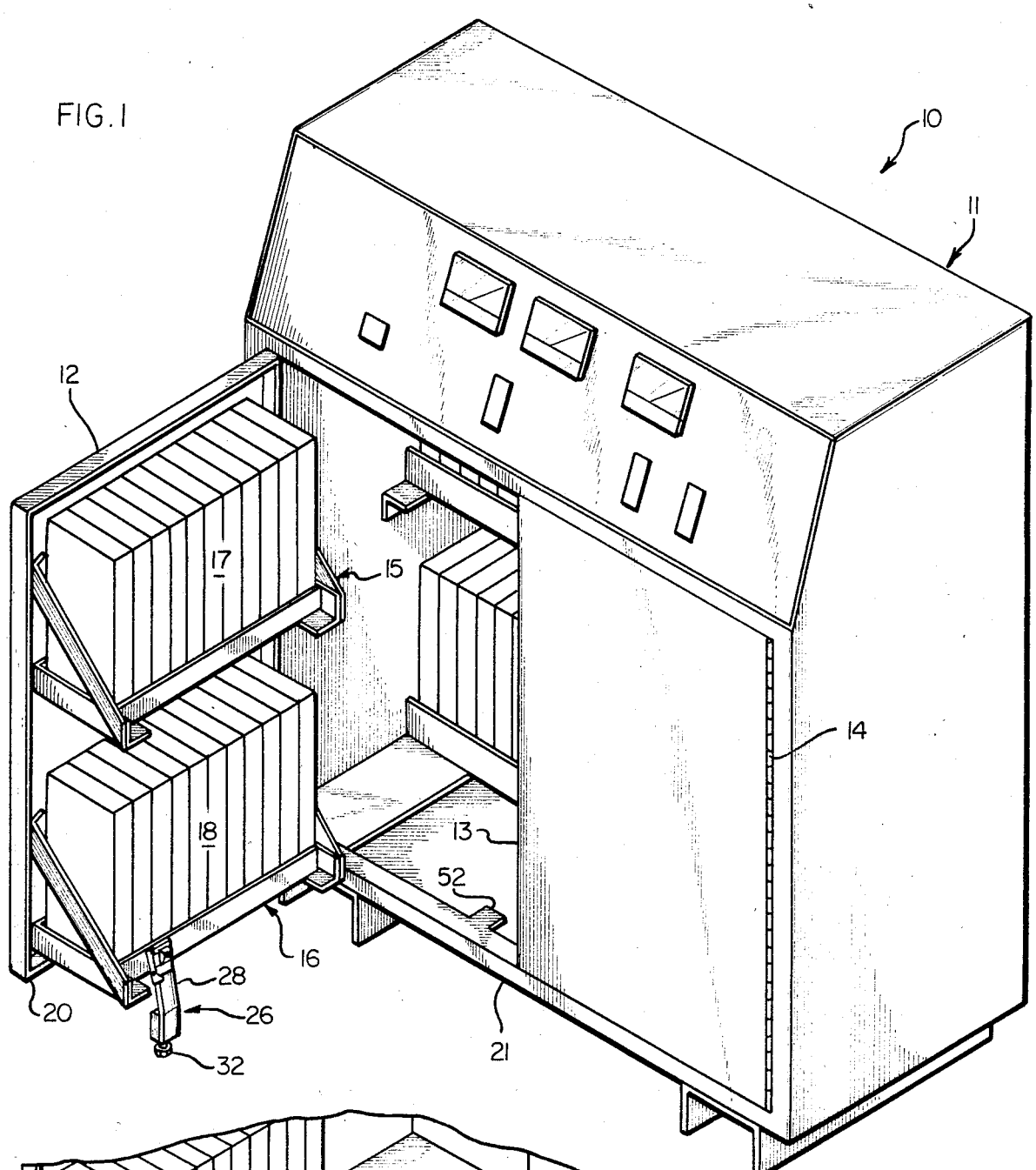
FIG. 1 is a perspective view of a battery console cabinet employing an automatic pivotable door support embodying the principals of the present invention.
Figure 2:
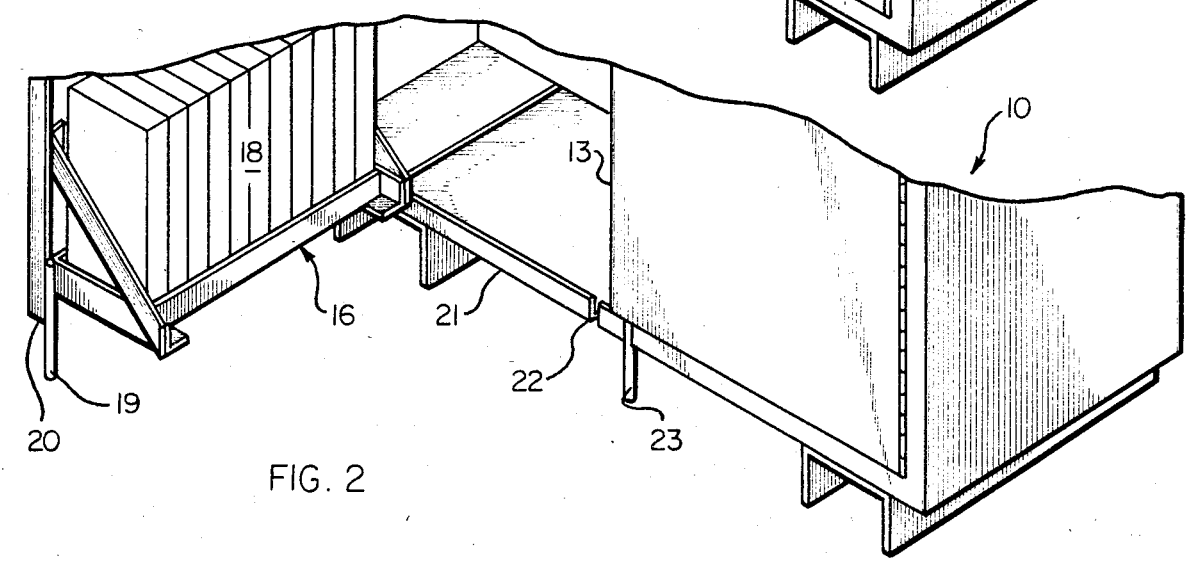
FIG. 2 is a perspective view of a cut-away portion of the cabinet of FIG. 1, showing an alternative embodiment of the support of the invention employing a fixed leg.

Referring to FIG. 1, there is shown a battery console 10, including a cabinet 11, having a pair of doors 12,13 mounted to the cabinet 11 by vertical hinges 14. Mounted to the interior surface of each door, only one of which is visible, are a pair of shelves 15,16 on which a group of battery cells 17,18 are mounted. It is well known that these battery cells are relatively heavy and can impose a large cantilever load on the vertical hinge as well as causing the cabinet to tip forward. As shown in FIG. 2, an elongated, rigid, fixed support leg 19 is affixed to the lowermost free corner 20 of the door 12. The cabinet shown is of the type which includes a full 360° door frame of, for example, angle iron for strength. The lowermost frame member 21 is provided with a cutout portion 22 that accepts the support leg 19 providing for complete closing of the door and flush aesthetically pleasing appearance to the cabinet front. The other door 13 is also provided with an identical support leg 23. Each support leg 19,23 is preferably dimensioned to provide a slight clearance space between the floor and the end of the leg, so as to allow the door to be opened and closed without excessive scraping and to allow for irregularities in the floor.

Referring to FIG. 3, there is shown a support which allows easier movement of the door than that of FIG. 2. A castor wheel 24 is rotatably journaled in a bracket 25 that in turn is affixed to the door free corner 20. Preferably, the bracket 25 or the castor wheel attachment is made to provide for vertical adjustment of the wheel relative to the floor. it can be seen that the castor wheel support is a desirable one from an operational point-of-view, since the door is fully supported over its entire movement from the closed position to the open position shown in FIG. 3, and the clearance space necessitated with fixed legs is not required. The frame rail 21 is provided with the cut-outs 22 to accomodate the castor wheel when the door is closed.

Figure 5:
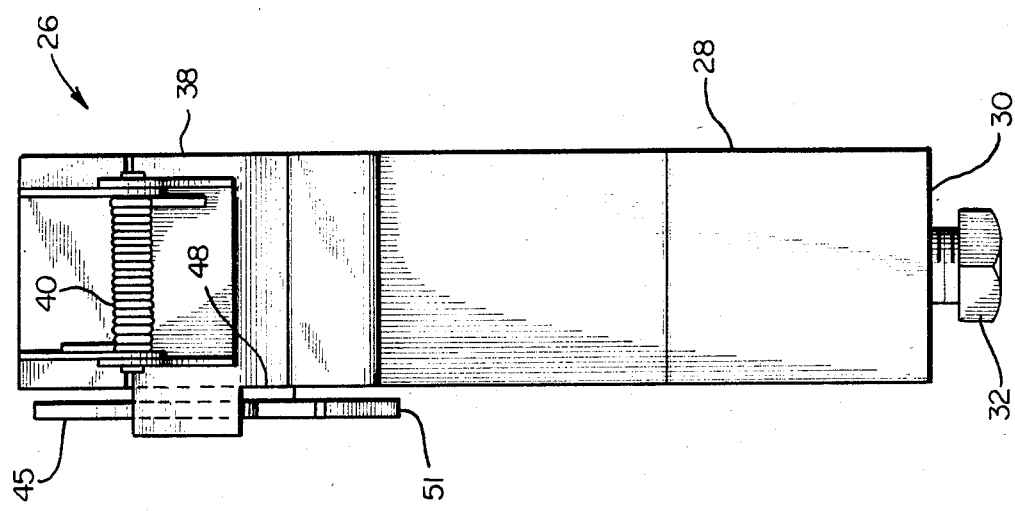
FIG. 5 is a front view of the pivotable support showing details of construction.

An automatic extending and retracting support device 26 is shown generally in FIG. 1. As shown in detail in FIGS. 5-7, the automatic support 26 includes an angle shaped bracket 27, which is adapted for attachment proximate the lowermost free corner 20 of the door with, for example, screw fasteners or permanently by welding if desired in the case of metal doors. A support leg 28 depends substantially vertically from the bracket 27, and is provided with a block 29 adjacent its free end 30. Block 29 has a vertical threaded clearance hole 31, see FIG. 8a, into which a leg adjustment bolt 32 is threadedly engaged. It can be seen that the length of the support leg is adjusted to compensate for floor irregularities by turning the adjustment bolt 32 to extend or retract the bolt from the block 29. The leg 28 is pivotally attached to the bracket 27 by a spring 34, which biases the support leg toward the extended, vertical support position as shown in FIG. 8c.

Figure 6:
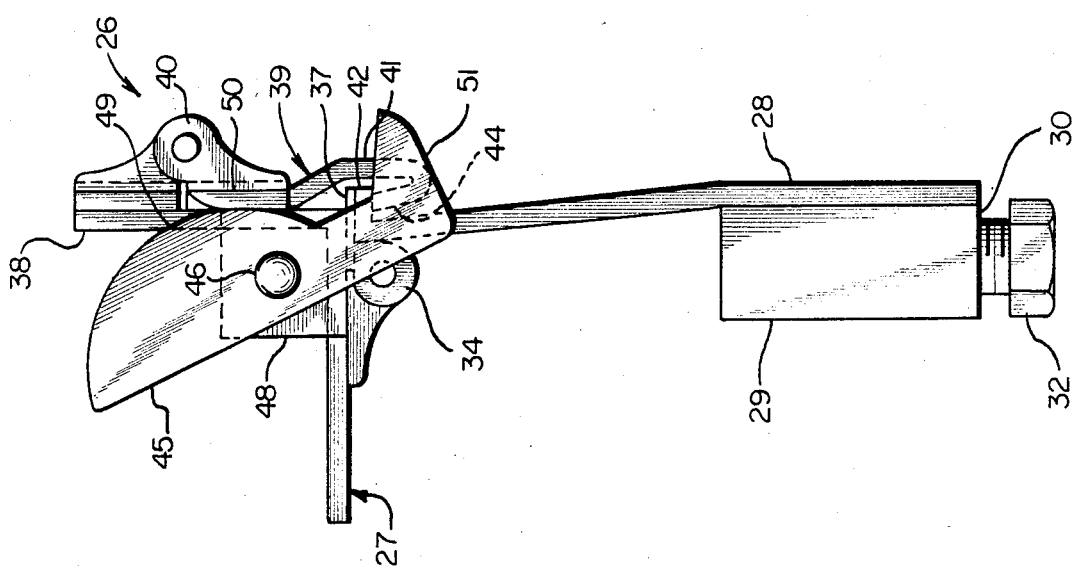
FIG. 6 is a side view of the pivotable support showing details of construction.

As best shown in FIG. 6, the distal end of the support leg 28 is provided with a stop arm 37 which is defined by a turned out portion of the support leg at the distal end and which protrudes at approximately a right angle from the leg. With the support leg 28 biased into the extended, support position, the stop arm 37 is positioned in abutment with the bracket 27 which thereby positions the support leg in the support position.

Figure 7:
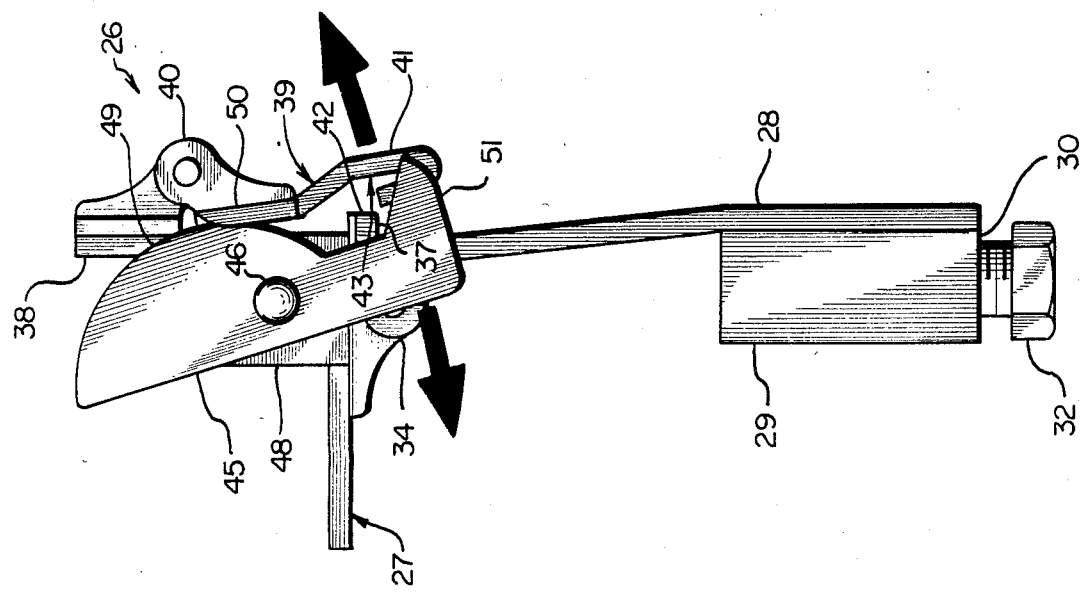
FIG. 7 is a side view of the pivotable support showing details and operation of the latch and latch release mechanism.

Still referring to FIG. 6, and also to FIG. 7, a latch arm 39 is pivotally attached to the vertical leg portion 38 of the bracket by a spring assembly 40. The latch arm 39 is stamped or otherwise formed to include a depending offset portion 41 that clears the end 42 of the stop arm 37 and has its distal end folded or otherwise formed back over itself to define a generally hooked shaped latch 43 and a latch cam surface 44 over which the end 42 of the stop arm rides during operation and is captivated by the latch.

The support device is provided with a manually or automatically operated latch release mechanism, as shown in FIGS. 6 and 7, the operation of which is set out hereinbelow. A latch release lever 45 is pivotally attached to the bracket 27 by a pin 46 positioned in a clearance hole in the release lever 45 and a mounting plate 48 fastened to the bracket 27. The release lever 45 includes a release cam surface 49 that engages a latch release operating tang 50 affixed to the latch arm. The lower portion 51 of the release lever is configured to be finger actuated or to engage a member (not shown) on the cabinet as the door is closed to operate the release mechanism as set out below.

OPERATION

Figure 8A:
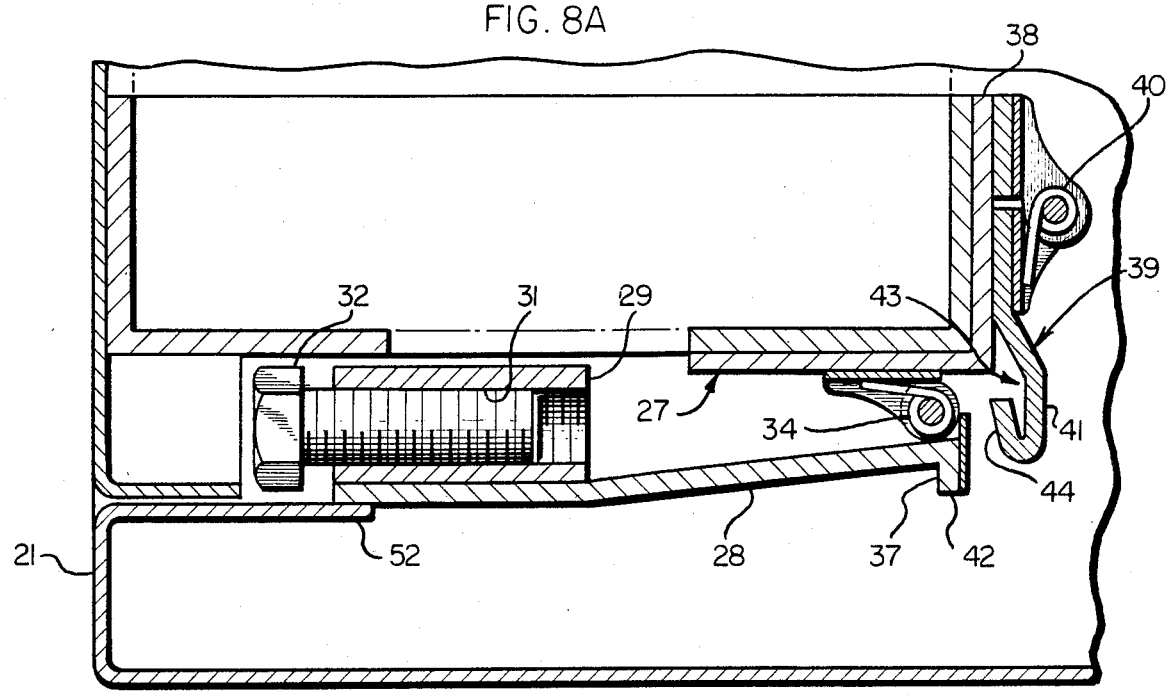
FIG. 8a is a side view of the pivotable support in operation shown in the retracted or stored position, with the door closed.
Figure 8B:
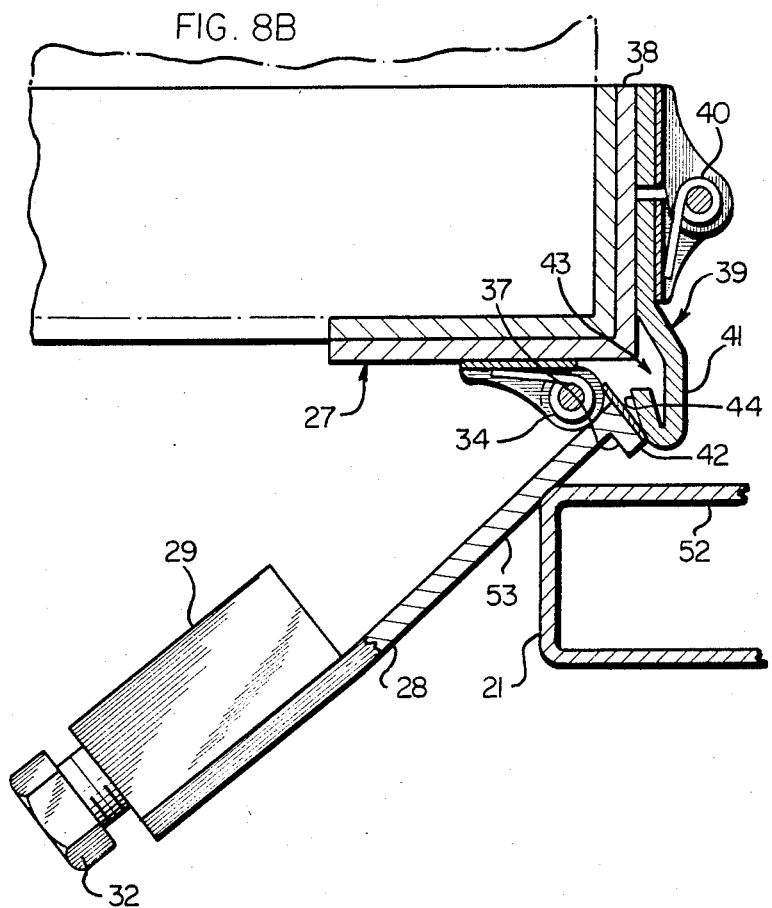
FIG. 8b is a side view of the pivotable support in operation shown in a partially extended position with the door partially open.
Figure 8C:
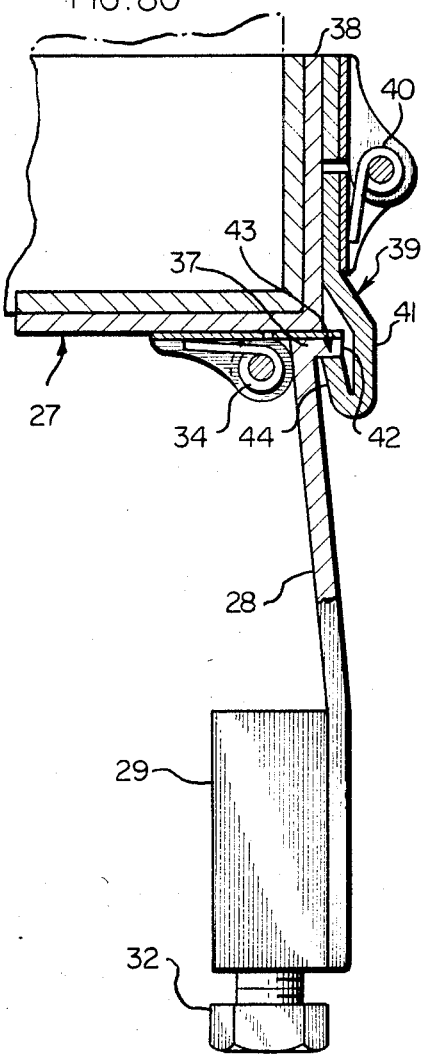
FIG. 8c is a side view of the pivotable support in operation shown in a fully extended, support position with the door open.

In operation, with the cabinet doors in the closed position, as shown in FIG. 8a, the support leg 28 of the device is retracted into a generally horizontal, stored position below the bottom of the door. The support leg is held in the stored position by a horizontal, shelf-like projection 52 on the lower door frame rail 21. As the door is moved to an intermediate open position, such as that of FIG. 8b, the support leg is biased by the force of the spring 34 and the lower surface 53 of the support leg slides along the lower frame rail of the cabinet toward the vertical support position as the door continues to open. As shown in FIG. 8b, the end 42 of the stop arm 37 contacts the latch cam surface 44 in the intermediate position and causes the latch arm 39 to pivot counter clockwise, as viewed in FIGS. 8b and 7, against the bias force of the latch arm spring 40. When the door has been opened sufficiently to allow the support leg to clear the frame rail, the spring 34 causes the leg to be immediately moved to the fully extended, vertical support position of FIG. 8c, whereat the stop arm clears the cam surface 44 and is captivated by the spring loaded latch 43.

To release the latch and allow the support leg to be retracted to the stored position, the lower end 51 of the release lever is actuated either manually by pivoting the lever clockwise, as viewed in FIG. 7, or by closing the door, thereby causing the lower portion of the lever to contact the cabinet and be pivoted by further movement of the door. In either case, the release lever pivots the release cam surface 49 so as to contact the latch release operating tang 50 which causes the latch arm to pivot counter clockwise, as viewed in FIG. 7, and thereby disengage the latch from the stop arm. Further movement of the door toward the closed position causes the support leg lower surface 53 to contact the cabinet frame rail forcing the leg upward against the force of spring 34 into the stored position.

Having described the preferred embodiment of the invention, those skilled in the art having the benefit of that description and the accompanying drawings can readily devise other modifications and embodiments. Therefore, said other embodiments and modifications are to be considered to be within the scope of the appended claims.

We claim:
1. A support for a vertically hinged door comprising:
bracket means for attachment proximate a lower most free corner of the door;
support means attached to said bracket means and depending from said bracket means to engage a support surface, said support means being an elongated leg having one end pivotably attached to said bracket means for movement between a retracted stored position and an extended support position and having a free end with a castor wheel rotatably journaled to said free end;
stop means operatively associated with said leg for positioning said leg in the support position; and first spring means operatively associated with said leg for biasing said leg toward the support position.
2. The support as defined in claim 1 further comprising latch means operatively associated with said leg for releasably engaging and retaining said leg in the support position.
3. The support as defined in claim 2 further comprising means for releasing said latch means from engagement with said leg.
4. The support as defined in claim 1, wherein said stop means includes a protrusion on said leg at said one end thereof in abutment with said bracket means in the support position, said first spring means biasing said protrusion against said bracket means and including
latch means operatively associated with said leg for releasably engaging and retaining said leg in the support position and
means for releasing said latch means from engagement with said leg.
5. The support as defined in claim 4, wherein said latch means includes:
a latch arm pivotably attached at a proximal end thereof to said bracket means for movement between a latched position and an unlatched position and having a bent portion at a distal end thereof configured to engage said protrusion with said leg in the support position and said latch in the latched position; and second spring means operatively associated with said latch arm for biasing said latch arm toward the latched position;

6. The support as defined in claim 5, wherein said distal end of said latch arm is folded back over itself defining said bent portion and a latch cam surface.

7. The support as defined in claim 5, wherein said means for releasing said latch arm includes a release lever pivotably mounted to said bracket for movement between an engaged position and a released position, said release lever including a release cam surface engaging said latch arm, said latch arm being positioned in the unlatched position with said release lever positioned in the released position.

8. The support as defined in claim 7, wherein said release lever includes means adapted to engage an external member when said door is closed for pivoting said release lever to the released position, thereby automatically unlatching said support leg.

9. An automatic door support comprising:

bracket means for attachment proximate to the lower end of said door;

a support leg pivotably attached at one end thereof to said bracket means for movement between a retracted generally horizontal stored position below the lower end of said door and an extended substantially vertical support position depending from said door;

stop means operatively associated with said leg and said bracket means for positioning said leg in the support position;

first spring means operatively associated with said bracket means and said leg for biasing said leg toward the support position;

latch means operatively associated with said leg and said bracket means for releasably retaining said leg against movement in the support position; and automatic release means operatively associated with said latch means for releasing said latch means when said door is closed.

10. The support as defined in claim 9 further comprising means for adjusting the length of said support leg.

11. An automatic door support comprising:

a bracket adapted to be attached to said door proximate a lowermost free corner of said door;

a support leg pivotably attached at one end thereof to said bracket for movement between a generally horizontal stored position below said lowermost corner of said door and a substantially vertical support position depending from said corner;

a stop arm on said bracket engaging said support leg in the support position;

a first spring attached to said bracket and said support leg biasing said support leg toward the support position;

a latch arm pivotably attached at its proximal end to said bracket for movement between a latched position and an unlatched position, said latch arm being turned back over itself at its distal end defining a hook shaped latch engaging said stop arm when said leg is in the support position and further defining a latch cam surface, said stop arm rides over said latch cam surface to engage said latch;

a second spring attached to said bracket and said latch arm biasing said latch arm toward the latched position; and a release lever pivotably attached to said bracket for movement between an engaged position and a released position and including a first release cam surface slidably abutting said latch arm, and a second release cam surface engaged to the frame of said door when said door is closed.

12. The support as defined in claim 11 further comprising a castor wheel rotatably journaled to said support leg.

* * * * *